(12) United States Patent
Catzel

(10) Patent No.: US 7,216,698 B2
(45) Date of Patent: May 15, 2007

(54) AIR-CONDITIONING SYSTEM

(75) Inventor: Pincus Catzel, Constantia (ZA)

(73) Assignee: Uniflair S.P.A., Conselve (IT)

( * ) Notice: Subject to any disclaimer, the term of this patent is extended or adjusted under 35 U.S.C. 154(b) by 509 days.

(21) Appl. No.: 10/478,004

(22) PCT Filed: Apr. 19, 2002

(86) PCT No.: PCT/EP02/04326

§ 371 (c)(1),
(2), (4) Date: Mar. 25, 2004

(87) PCT Pub. No.: WO02/093080

PCT Pub. Date: Nov. 21, 2002

(65) Prior Publication Data

US 2004/0148950 A1   Aug. 5, 2004

(30) Foreign Application Priority Data

May 16, 2001   (LU) .................................. 90778

(51) Int. Cl.
*F24F 3/00* (2006.01)

(52) U.S. Cl. .................. 165/214; 165/205; 165/207; 165/240; 237/2 R; 237/12.1

(58) Field of Classification Search ................ 165/205, 165/207, 214, 240; 237/2 R, 2 B, 12.1
See application file for complete search history.

(56) References Cited

U.S. PATENT DOCUMENTS 4,473,107 A    9/1984   Fairbrother et al.

FOREIGN PATENT DOCUMENTS

| DE | 23 49 372 | 4/1975 |
|---|---|---|
| EP | 0 281 762 | 9/1988 |
| GB | 2 295 888 | 6/1996 |

*Primary Examiner*—Ljiljana Ciric
(74) *Attorney, Agent, or Firm*—Oblon, Spivak, McClelland, Maier & Neustadt, P.C.

(57) ABSTRACT

An air-conditioning system for a building includes a hot water distribution circuit, a cold water distribution circuit, and several terminal air conditioning units. Each of the terminal air conditioning units includes a fan blowing air in a space of the building, a heating coil connected to the hot water distribution circuit and/or a cooling coil connected to the cold water distribution circuit. At least one ambient temperature control system allows to control heating power of the heating coils and cooling power of the cooling coils. The system further includes a calorific energy management system with a heat pump for transferring calorific energy: a) from the cold water distribution system to the hot water distribution system; b) from the cold water distribution system to atmosphere; and c) from the atmosphere to the hot water distribution system. The calorific energy management system can manage the calorific energy transfers with a three level control system to optimize energy consumption.

29 Claims, 6 Drawing Sheets

AIR-CONDITIONING SYSTEM

FIELD OF THE INVENTION

The present invention relates to an air-conditioning system.

BACKGROUND OF THE INVENTION

Modern buildings generally have large areas of glass and a wide range of internal temperature requirements, with both internally- and externally-generated heat loads. This diversity necessitates zone temperature control and high levels of air purity in order to ensure adequate comfort levels even with high occupation densities of people and equipment. Internally generated heat loads contribute to a large extent to the total cooling load or the total heating load. The main internal heat sources being electrical and electronic equipment and high illumination densities.

Localised climate control becomes necessary in large open-plan areas where individual workstations or equipment positions may require different temperatures. It is becoming more and more common to find people and equipment in the same office, requiring variation in thermal provision both in terms of Watts per square meter and seasonal changes. High-technology areas, such as computer rooms and control rooms, normally require air conditioning even during the winter since the heat produced by the equipment normally exceeds natural heat loss. There is therefore the need for a heating and air conditioning system which can effectively control conditions in the building and which has the flexibility to adapt to the range of needs over the various areas and in different seasons. Independent systems are normally used for the climate control of different areas, excluding the possibility of synergy and of intelligent control. There may be simultaneous demand for heating and cooling, each managed independently with significant energy wastage.

Furthermore, modern buildings have to be designed so as to enable a high flexibility of space configuration and occupation. It follows that space configuration and occupation can change many times over the life of a building and it is therefore important to ensure that air-condition systems can be easily adapted to such changes.

OBJECT OF THE INVENTION

A technical problem underlying the present invention is to provide a flexible and energy saving air-conditioning system for buildings which necessitate zone temperature control and in which there is a simultaneous demand for heating and cooling.

SUMMARY OF THE INVENTION

A building air-conditioning system in accordance with the present invention comprises a hot water distribution circuit, a cold water distribution circuit and a plurality of terminal air conditioning units. Each of these terminal air conditioning units comprises a fan for blowing air in a space of the building, a heating coil connected to the hot water distribution circuit and/or a cooling coil connected to the cold water distribution circuit. An ambient temperature control system allows to control heating power of the heating coils and cooling power of the cooling coils. In accordance with an important aspect of the present invention, the system further comprises a calorific energy management system including a energy provider with a heat pump cycle that is capable of transferring calorific energy from the cold water distribution system to the hot water distribution system. In a preferred embodiment, the energy provider is further capable of transferring calorific energy: a) from the cold water distribution system to atmosphere, and c) from the atmosphere to the hot water distribution system. The calorific energy management system is capable of managing the calorific energy transfers so as to maintain pre-set temperature levels in the hot and cold water circuits and to optimize energy consumption, wherein optimizing energy consumption means e.g. a minimization of global primary energy consumption or a minimization of global energy costs of the air-conditioning system.

For further optimizing energy consumption, the system advantageously includes an heat exchanger means capable of transferring calorific energy from the cold water distribution system to atmosphere in a free cooling process.

For optimizing cooling energy production, the system advantageously includes a cooling energy buffer tank. This buffer tank allows to store a momentary surplus cooling energy or—from another point of view—to produce cooling energy in advance when the conditions cooling energy production conditions are the most advantageous, and this independently from the momentary demand of cooling energy.

For optimizing heating energy production, the system advantageously includes a heating energy buffer tank. This buffer tank allows to store a momentary surplus heating energy or—from another point of view—to produce heating energy in advance when the conditions for heating energy production are the most advantageous, and this independently from the momentary demand of heating energy.

For satisfying peak demands of heating energy, the system advantageously includes a heat generator capable of producing calorific energy and of transferring this calorific energy to the hot water distribution system.

Energy consumption is further reduced if the calorific energy management system is capable of monitoring the cooling/heating energy requirements of each of the terminal air conditioning units and of set-point variation of the cold and hot water circuit temperatures in function of the cooling/heating energy requirements of the terminal air conditioning units.

The calorific energy management system is advantageously capable of managing the calorific energy transfers taking into account global building heating/cooling requirements, outside climatic parameters and primary energy costs.

In order to enable a high flexibility of space configuration and occupation, the hot water distribution circuit and the cold water distribution circuit advantageously include quick-fitting connections at regular intervals for connecting thereto a heating coil, respectively a cooling coil by means of flexible tubes.

The terminal air conditioning units are advantageously installed in a plenum space either under a raised floor or above a suspended ceiling, wherein the fans of the terminal air conditioning units take in air from the plenum space.

Such a terminal air conditioning unit advantageously comprises a modular casing mounted e.g. under a floor panel of a raised floor. This modular casing includes a supply air outlet connected to an air inlet grid in the floor panel and an air inlet opening in the plenum space. A fan mounted is mounted in the modular casing so as to take in air from the plenum space through the air inlet and blow it through the air inlet grid in the floor panel into a building zone located above the raised floor plenum. It further includes a heating coil connected to the hot water distribution system and/or a cooling coil connected to the cold water distribution system. The heating coil and cooling coil are advantageously mounted-in the modular casing in-between the fan and the supply air outlet. Such a terminal air conditioning unit may further comprise a filter element mounted in the modular casing, wherein the filter element is replaceable via an inspection slot in the floor panel.

In a further embodiment, such a terminal air conditioning unit comprises for example a modular casing that is mounted under a floor panel of a raised floor and includes a supply air outlet, which connected to an air inlet grid in the floor panel and a mixing chamber with a return air port and a fresh air port. A fan is mounted in the modular casing so as to take in air from the mixing chamber and blow it through the air inlet grid in the floor panel into a building zone located above the raised floor plenum. This unit may further include a direct-expansion cooling unit for cooling and dehumidification of the supply air. Mounted in the modular casing the direct-expansion cooling unit may comprise a water-cooled condenser connected to the cold water circuit and a post-heating coil mounted in the modular casing and connected to the hot water circuit for reheating the air after its dehumidification. The air-conditioning system may further include a fresh air conditioning unit capable of preconditioning fresh air and of supplying it into the plenum space.

It will be appreciated that an air-conditioning system in accordance with the invention allows:

➢ to transfer heat from an area with a cooling requirement to one with a heating requirement and vice versa, using the external energy supply only for loads in excess of the internal balance;
➢ to integrate the heating and cooling systems, reducing energy consumption and space occupied;
➢ to simplify and speed up installation and to reduce installation costs; and
➢ to provide a high level of system flexibility so that any change in the layout of the building can be accommodated easily and at low cost.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
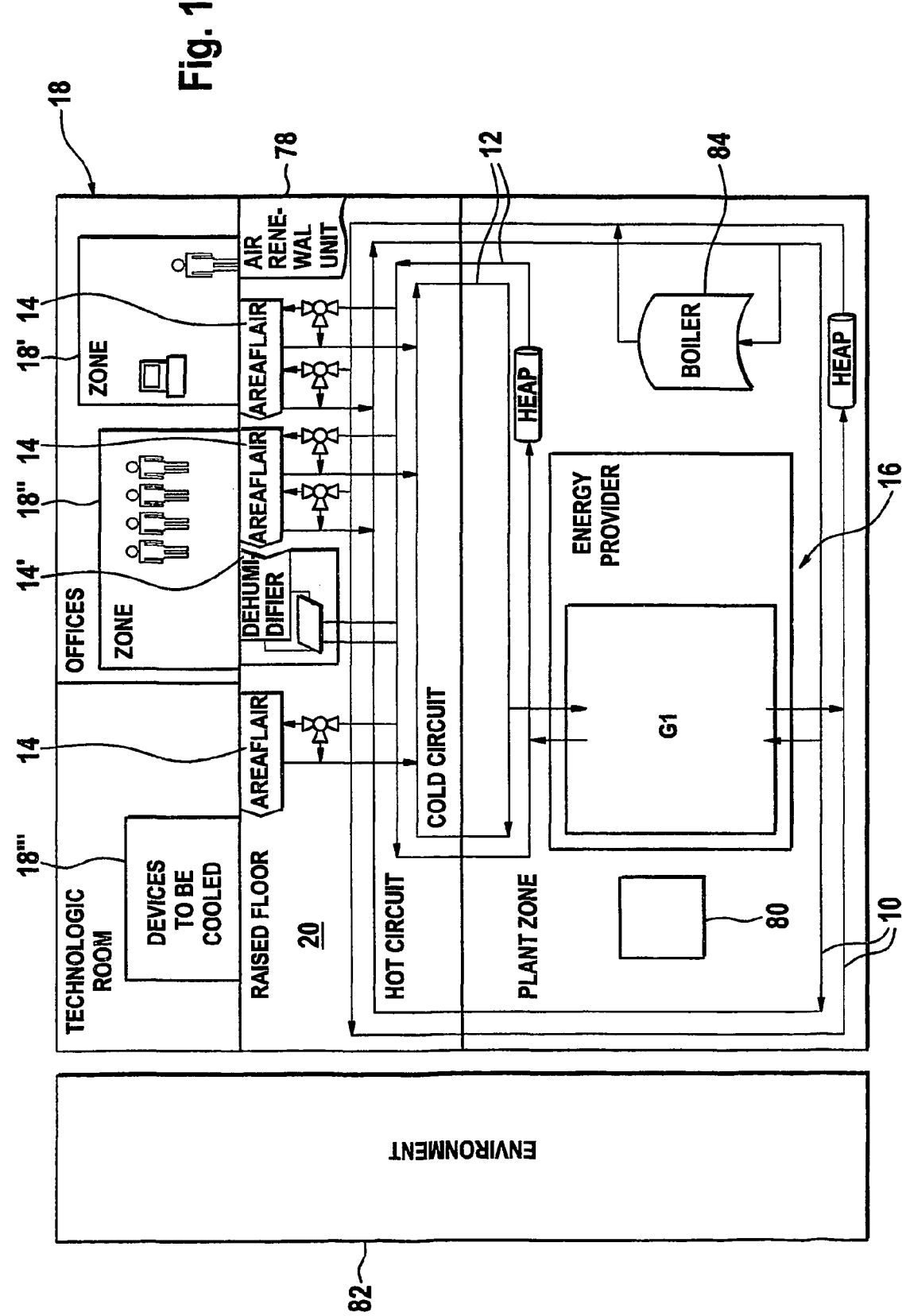
FIG. 1: is a schematic diagram giving a general overview of an air-conditioning system in accordance with the present invention.

FIG. 1 shows schematic diagram of an air-conditioning system in accordance with the present invention. This system comprises a hot water distribution circuit 10 and a cold (or chilled) water distribution circuit 12, a plurality of terminal air conditioning units 14, which are also called zone terminal units, and a heat/cooling generator 16 also called "energy provider" 16.

The hot and cold water distribution circuits 10, 12 are conceived as closed peripheral energy distribution loops in a building 18. Various zones 18', 18", 18''' of the building 18 require cooling and/or heating energy according to their specific needs. The whole air-conditioning system is conceived with a similar logic to that of electrical energy distribution: cold and hot water distribution networks are installed in the building 18 and then, according to individual needs, local terminal units 14 draw on the primary distribution to guarantee temperature and humidity control in the different zones 18', 18", 18''', while the energy provider 16 maintains the energy levels of the two energy distribution loops 10, 12, interacting with all the system components to optimize energy usage. All connections on the energy distribution loops 10, 12 for the zone terminal units 14 are preferably of a quick connection type and combined with flexible pre-insulated piping to warrant an easy installation.

Various types of terminal air conditioning units 14 allow effective air conditioning in various zones 18', 18", 18''' of the building. These zone terminal units 14 provide the heating-cooling of the individual zones 18', 18", 18''' in which they are installed. They are advantageously designed for installation in a raised floor plenum 20 to maximise flexibility and improve the use of space.

Figure 2:
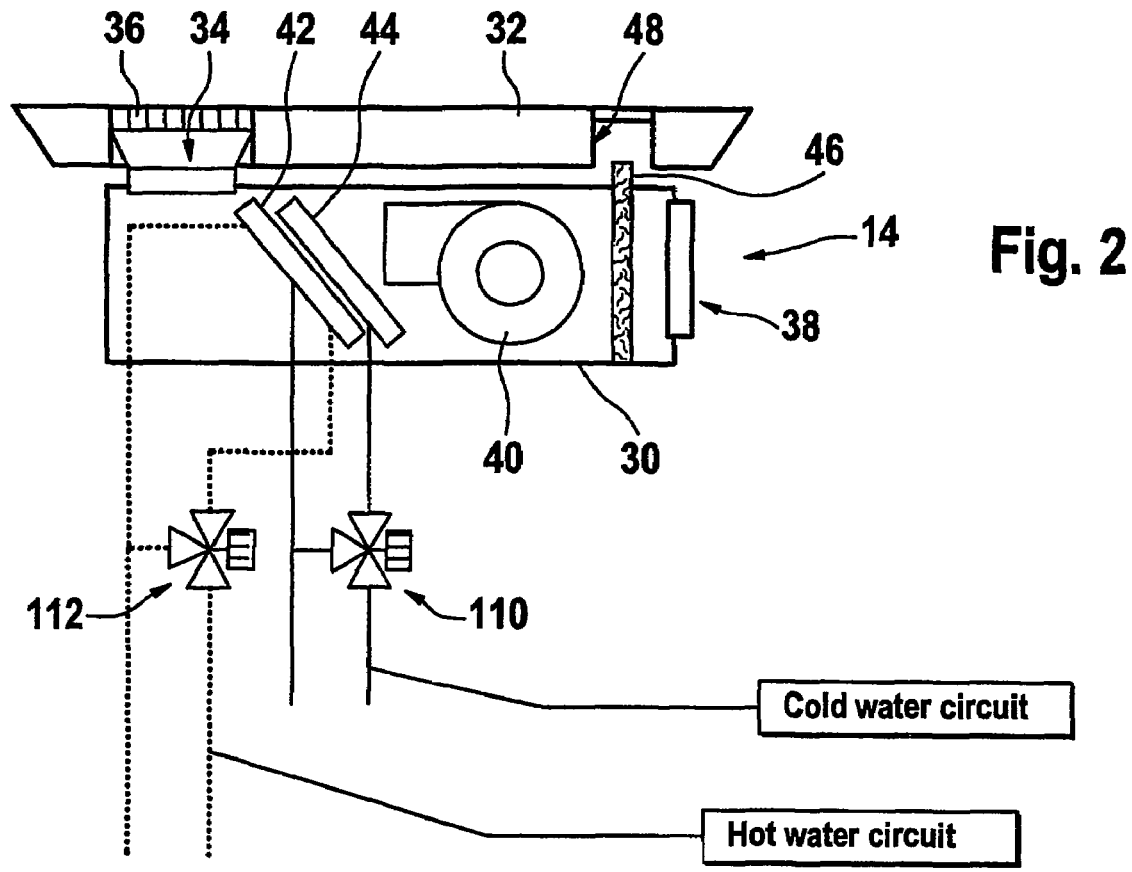
FIG. 2: is a schematic section of a first type of terminal air conditioning unit.

FIG. 2 shows a terminal air conditioning unit 14 that is capable of heating an cooling. It has a modular casing 30 that is mounted under a floor panel 32 of a raised floor system. This modular casing 30 includes a supply air outlet 34, which is connected to an air inlet grid 36 in the floor panel 32, and an air inlet 38, which is located in the in the raised floor plenum 20. A fan 40 is mounted in the modular casing 30 so as to take in air from the raised floor plenum 20 through the air inlet 38 and blow it through the air inlet grid 36 in the floor panel 32 into the building zone 18', 18", 18''' located above the raised floor plenum 20. A heating coil 42 and cooling coil 44 are mounted in the modular casing 30 between the fan 40 and the supply air opening 34. A filter element 46 is mounted in the modular casing 30 between the air inlet 38 and the fan 40. This filter element 46 is advantageously replaceable via an inspection slot 48 in the floor panel 32.

Within technical zones, such as zone 18''', fresh-air inlet and dehumidification of the air are generally not required. For such applications terminal air conditioning units 14 must mainly provide sensible cooling. Consequently, the terminal air conditioning units should have a very high SHR [sensible heat ratio]. However, in areas where persons are present, such as zone 18", it may further be necessary to ensure dehumidification of the space and to introduce fresh air. To carry out this function a dedicated unit is used to provide humidity control in the area concerned. The dehumidifier module can be installed under the floor. The dehumidifying unit can e.g. be of the direct expansion air cooled type with evaporator and condenser coils in series. In this way the temperature of the cold loop does not have to be constrained to that required for latent cooling, a fraction of the total thermal load. In the event that the latent loads are high, it is necessary to dissipate the condenser heat externally. Where there is controlled ventilation of the area the exhaust air stream can be used for the purpose.

Figure 3:
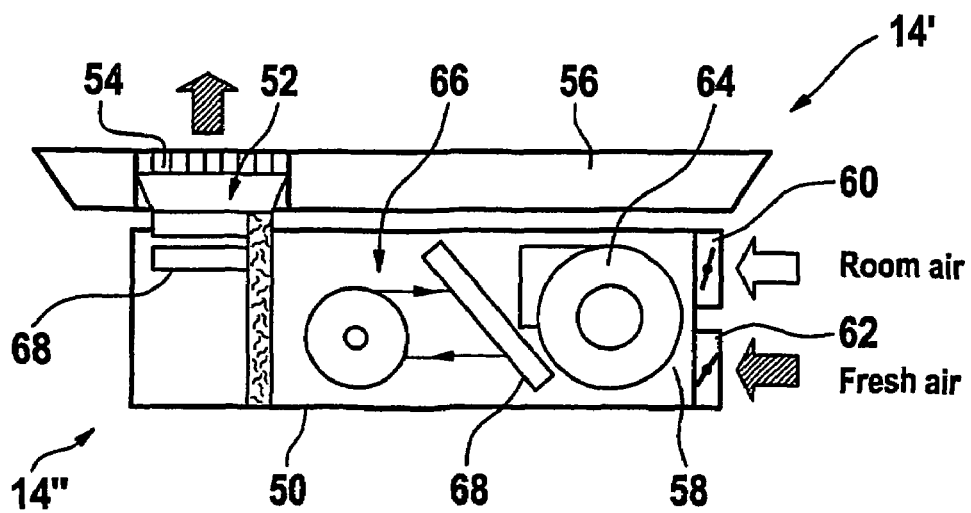
FIG. 3: is a schematic section of a second type of terminal air conditioning unit.

FIG. 3 shows a terminal air conditioning unit 14' that it is capable of dehumidification and fresh air supply. Its modular casing 50 includes a supply air outlet 52, which is connected an air inlet grid 54 in a floor panel 56, and a mixing chamber 58 with a return air port 60 and a fresh air port 62. A fan 64 is mounted in the modular casing 50 so as to take in air from the mixing chamber 58 and blow it through air inlet grid 54 in a floor panel 56 into the building zone 18', 18'', 18''' located above the raised floor plenum 20. The terminal air conditioning unit 14'' further includes a direct-expansion cooling unit 66 for cooling and dehumidification of the supply air. Mounted in the modular casing, the direct-expansion cooling unit advantageously comprises a dehumidifying evaporator coil 68 and a water-cooled condenser (not shown) that is connected to the cold water circuit 12. A post-heating coil 68 is mounted downstream of the dehumidifying evaporator coil 68 and connected to the hot water circuit 10 for reheating the air after its dehumidification in the direct expansion coil 68. It will be noted that with such a terminal air conditioning unit 14'', condensation heat is not wasted but is transferred into the hot water circuit 10 and used in building zones 18', 18'', 18''' which require heating.

Referring again to FIG. 1, it will be noted that the air-conditioning system may further include a fresh air conditioning unit 78 (also called air renewal unit 78), which capable of pre-conditioning fresh air and of supplying it into the plenum space.

The energy provider 16 and the energy network 10, 12 (hot and cold loops) are controlled by a thermal management system 80 which maintains the temperature level in the two loops 10, 12 with the minimum consumption of energy under all operating conditions. The energy provider 16 works on the basis of heat transfer between the hot and cold loops 10, 12, as a function of the thermal requirements of the terminal units 14. In this way the temperature level of the two loops 10, 12 is maintained with the minimum level of energy consumption because only topping up is required.

In order to reduce to a minimum the amount of energy consumed, the system relies e.g. on following resources:
1. hot water distribution loop 10;
2. cold water distribution loop 12;
3. external environment 82;
4. a heat pump cycle;
5. a free cooling system;
6. one or more boilers 84 (if heating top-up is necessary during the winter period)

If only sensible cooling terminal units are used and if humidity control is achieved by a dedicated unit, it is possible to have a relatively high temperature in the cold loop 12 with a consequent rise in the coefficient of performance (COP) in the production of cooling with a refrigerant vapour compression cycle, or to extend the use of free cooling.

Figure 4:
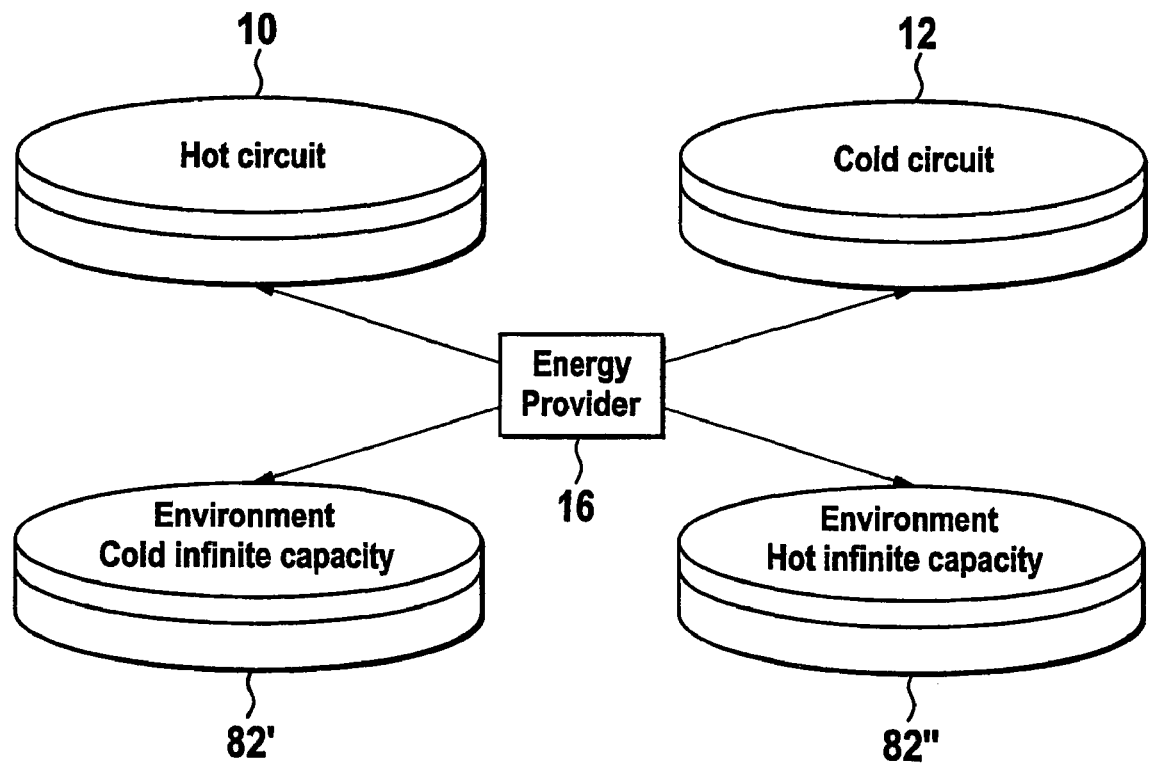
FIG. 4: is schematic diagram illustrating the energy exchange in the system.

The basic functioning of the energy provider will now be described with reference to FIG. 4. The heat pump cycle of energy provider 16 is capable of transferring the heat extracted from the cold loop 12 and the power absorbed in the heat pump cycle to the hot loop 10. If the required temperature is reached in the hot loop 10, the excess heat of condensation is dissipated externally (cold sink with infinite capacity 82'). In the event that cooling is required during the winter season (e.g. in technical zones 18'''), the energy provider 16 can use external air for free cooling of the water in the cold loop 12. If during the cooling function the loads are less than the maximum, it is possible to increase the temperature in the cold loop 12, thereby increasing the system COP without losing temperature control in the space.

The energy provider 16 also maintains the temperature in the hot loop 10 by using the heat pump cycle. The heat energy is obtained from the cold loop 12 or, if that has already reached the required temperature, from the outside environment (hot source of infinite capacity 82''). In the event that the heat produced by the heat pump cycle is not sufficient to cover the thermal requirements of the building 18, it is possible to use a traditional boiler 84 as top-up.

The control system 80 can evaluate thermal behaviour in the individual zones and process the data to identify trend lines for temperature and humidity parameters, necessary to anticipate the actions of the energy provider 16. Furthermore the incorporation of energy storage within the system can help to bring simultaneous heating and cooling requirements more into line to the obvious benefit of the overall system efficiency. The temperature levels in the two loops 10, 12 vary according to the thermal loads in the various areas.

Figure 5:
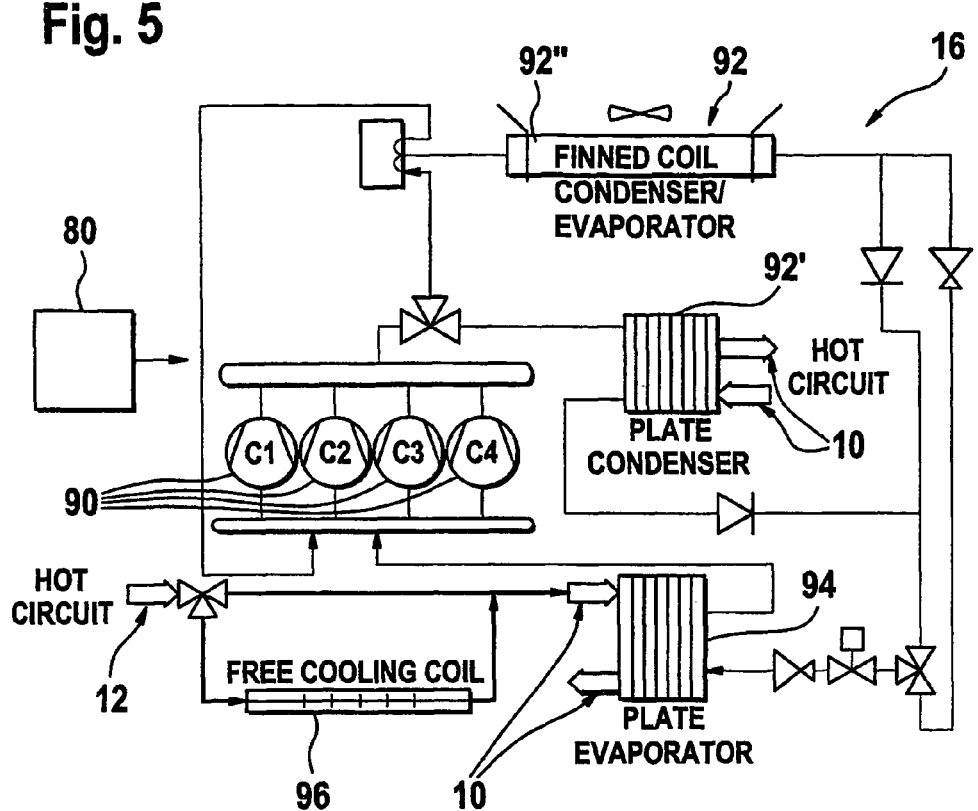
FIG. 5: is schematic diagram illustrating a single module energy provider.

A preferred embodiment of the energy provider is shown in FIG. 5. It is advantageously conceived as a modular unit to guarantee maximum flexibility in different applications. Each basic module has for example a cooling capacity of 150 kW. Up to a maximum of sixteen units can be used in parallel. In this way the energy provider 16 is extremely versatile and suitable for accurate control even with extremely variable thermal loads. The basic module is advantageously equipped with four compressors 90 that offer the possibility of further capacity control steps. "Scroll" technology is advantageously chosen for its benefits in terms of noise levels and efficiency. The refrigerant used is advantageously HFC R407C, in accordance with regulation CEE 2037/2000 for protection of the environment. The condenser system 92 advantageous uses two heat exchangers in parallel: if heating is required (heat pump or heat recovery function) a water cooled condenser 92' of the plate heat exchanger type is used (load condenser). Otherwise, the heat of condensation is dispersed into the atmosphere by means of a reversible heat exchanger of the finned coil type 92'' (dissipative condenser). The evaporation system is composed of a brazed plate water to refrigerant heat exchanger 94, that is used when the system operates as a water chiller (load evaporator), plus the above referenced reversible finned coil heat exchanger (dissipative evaporator), used in heat pump mode. Each module is fitted with water connections, pumps, expansion tank and free cooling coils 96 through which the return water flows, by means of a re-circulation pump, only when the temperature of the outside air is low enough to contribute a direct cooling effect. The benefit of the floating cold loop set point will be appreciated. Control of the flows in the building thermal loops is entrusted to the supervision of the centralized control system 80.

An air-conditioning system in accordance with the present invention is of particular interest for buildings in which: (1) the cooling load is generally of much greater magnitude than the heating load; (2) operation in cooling mode is required all year round, in view of the magnitude of the internal heat loads and the quality of building insulation.

Figure 6:
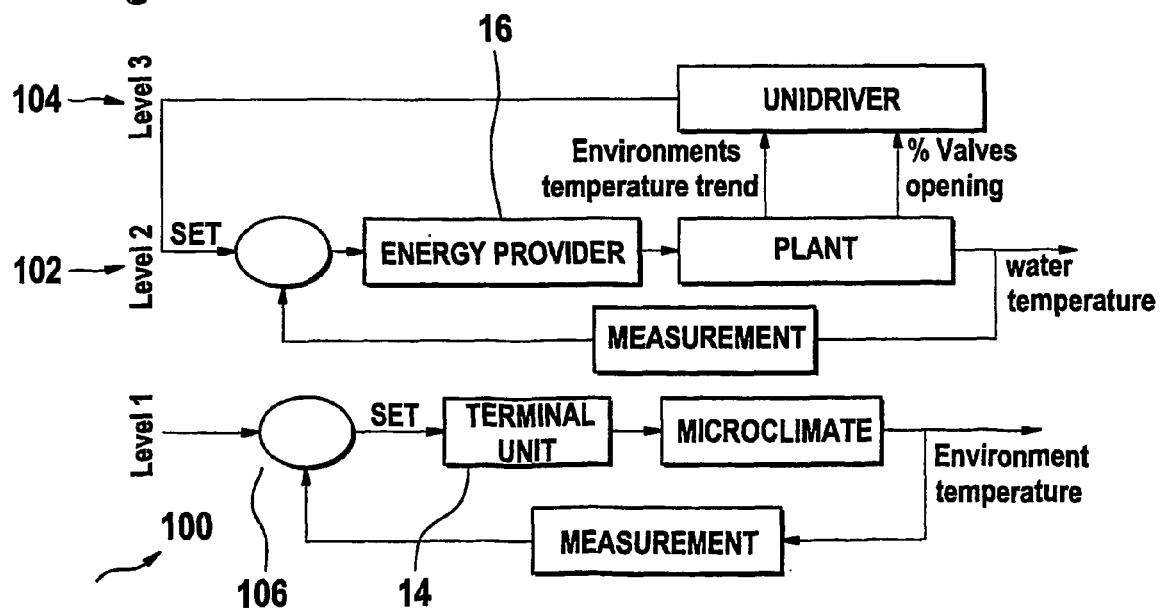
FIG. 6: is schematic diagram illustrating different control levels.

It will be appreciated that control of the air-conditioning system takes place at three levels (see FIG. 6):
1. microclimate level 100: air temperature and humidity set-point tracking in each zone (local control).

2. plant level 102: maintenance of the loop temperatures at set-point values.
3. system level 104: optimization of operation for least energy and economic cost taking into account building-plant interaction and making use of adaptive control and thermal load forecast techniques.

The microclimate level 100 concerns control within each individual zone. The user sets the space set point that the control module 106 maintains by controlling the three way valve of the heating or cooling coil.

The plant level 102 concerns the operation of the energy provider 16. It monitors the temperature in the cold loop 12, measures the deviation from the set point and provides the necessary cooling accordingly. With regard to the production of cold water, the energy provider 16 also monitors the temperature of the outside air to assess the possibility of using the free cooling function.

The system level 104 concerns optimization of the strategy over time for lowest energy/monetary cost. This control is based on trend analysis of the operating conditions, capacity steps and boundary parameters, using an algorithm to raise the set-point temperature of the cold loop 12 as high as possible in order to maximise overall energy efficiency. Measurement of the return water temperature in the hot loop 10 allows to determine the heating requirement, and enables to determine the condenser side working conditions (water cooled or air cooled). The condensing temperature, in the case of heat recovery, is dictated by the need to produce water at a temperature sufficient to supply the heating coils. In the type of building analysed, the positive heat available from the cycle is always sufficient to satisfy the thermal requirement. The system is also able to enforce some specific control actions in order to achieve maximum energy saving over a significant period, for example: the storage of hot or cold water, control of free cooling and generally actions that change the parameters of the control algorithm to enforce energy storage on the basis of an analysis of the trends of thermal parameters of the building or by adjusting system control actions and monitoring the reaction of the system.

At the microclimate level 100 the various zones (with one or more terminal modules 14) follow the space set-point of the thermostat, modulating the valves of the heating and cooling coils. Humidity is controlled independently by the dehumidification modules.

At the plant level, the energy provider measures the return temperature in the cold loop 12 and estimates the cooling capacity requirement (to which calculated cooling capacity must be added the "fictitious" cooling loads determined by the energy storage algorithm that operates at the third control level). The percentage opening of the 3-way valves 110, 112 of the terminal modules (see FIG. 2) allows the maximum increase in temperature in the cold loop consistent with the heat load to be evaluated.

On the basis of these data, an algorithm at control level 3 increases the temperature set-point of the water supply, with limits that take into account the trend of the conditions within the air conditioned space, maximizing the energy-efficiency. The algorithm evaluates the thermal loads in the zones taking into account the nominal capacity and the tolerance on the zone temperature set-point. The same algorithm also assesses the possibility of using free cooling at the actual plant working conditions. All these considerations are correlated because increasing the water temperature set-point improves the energy saving performance. The algorithm also assesses the value of using free cooling in relation to the needs of the hot loop by comparing the cost of otherwise producing the cooling by refrigerant compression with the cost of heating using the top-up boiler. Once the operating condition for the cooling load has been defined, the amount of heat available for recovery is calculated. The hot loop requirement is assessed and at this point the following possibilities are evaluated by the level 3 control. If the demand is immediate and less than the heat energy available, heat recovery is used and the balance dissipated by the air cooled condenser. Heat recovery penalises the condensing temperature. If the demand is immediate and higher than the heat energy available, the system decides, on the basis of an economic comparison in which the evaluation of the PER (Primary Energy Ratio) of the heat pump cycle and the boiler efficiency has a primary role, by which means to generate the necessary additional heat. If the demand for heat is not immediate, some heat energy is stored in the hot loop buffer tank.

At the third control level 104 the performance of the system is assessed over a longer time band compared to the previous levels. The result is to modify the parameters of the control algorithm, such as the temperature set-points of the loops and to activate "fictitious" thermal loads to favour heat recovery when the actual loads are out of phase, setting them to obtain maximum efficiency.

Level 3 control also determines the operating condition of the energy provider (cold water temperature, percentage split of condensing between water and air, percentage split of evaporation between water and air).

Description of a Simulation Program

To simulate the entire air-conditioning system a computer program was written. It includes a whole series of subroutines, each characterizing a single unit component, within the main program.

The system INPUT parameters are the profiles of: the heating and cooling loads, the external air temperature and the required water temperatures in the hot and cold loops. The system OUTPUT parameters are the operational parameters of the refrigeration circuit (temperatures and pressures at various points), the heat transfer flows, the electrical parameters of the motor and the refrigeration and heat pump coefficients of performances (COP).

The simulation model also includes a finned coil heat exchanger for free-cooling, when operating conditions permit.

The simulation program highlights the energy savings achievable through careful management of the overall system. The optimization logic is to operate with the highest possible return water temperature in the cold loop and the lowest possible in the hot loop that will still permit the cooling and heating loads to be met. These choices may not always be easy in the presence of thermal loads which vary both in amplitude and frequency between zones. A few terminal units in particularly unfavourable situations could impose a temperature level that is too onerous for the system. In this case it is necessary to evaluate whether the temperature of the fluid in the two circuits could be based more on the average needs of the zones and not just on those few subject to more demanding conditions. The control system has to manage the presence of thermal storage and must be capable of smoothing loads over time, or top-up boilers, or air-water heat exchangers for free cooling.

A few examples of the potential energy saving implied in this control philosophy will be given hereinafter, and a few basic schemes for putting it into practice will be proposed.

The simulation program allows the balance point between the various components to be established. Basically it identifies the condensing and evaporating temperatures that equalize the three values of the refrigerant mass flow rate handled by the compressor, condenser and evaporator, using predefined values for the vapour superheat at the outlet of the evaporator (a function of the calibration of the thermostatic expansion valve) and the liquid subcooling at the outlet of the condenser (generally set by the operator with a flooded condenser, or equal to zero if there is a liquid receiver). It is assumed that the expansion device, e.g. a thermostatic valve, does not influence the operation of the circuit, in that it adapts itself to the balance conditions set by the three principal components. The convergence of the variables towards the system balance conditions is obtained using the secant method to annul the two errors defined by the absolute values of the difference between two of the values of refrigerant mass flow rate compared to the third.

For determining the refrigerant properties required by calculation routines included in the simulation model, an interpolation subroutine is used (REFPINT), based on the data table generated using the calculation code REFPROP of NIST. Although all the common refrigerants have been inserted into the subroutine in question, this study refers exclusively to the zeotropic blend R407C. In this case the evolution of the temperature during the isobaric phase-change processes has been assumed to be a linear function of enthalpy.

As described above, the air-conditioning system has been conceived as a modular system capable of multistep control. To ensure high control flexibility and increased energy efficiency, in the presence of thermal loads which vary considerably both in space and time, the system comprises "n" identical modules, each fitted with a number of compressors 90 operating in parallel, a plate-type condenser 92', a plate-type evaporator 94, a reversible finned coil 92" (i.e.: to operate either as condenser or evaporator) and finally, an air cooled coil for free-cooling 96. The capacity control does not occur at the level of each single compressor 90, which will therefore always operate at its design condition, but is multistep, switching modules on and off according to the load.

The program determines the number of modules to operate on the basis of the heating/cooling requirements at a specific moment. If the load is not covered by an exact number of complete modules, the program determines the number of modules "n" capable of just exceeding the required capacity so "n–1" modules are just below the requirement. The percentage run-time of the module that therefore has to cycle on and off is evaluated on the basis of the average capacity that it must provide.

A brief description follows of a single module comprising multiple compressors 90, double condenser 92', 92", expansion valve and double evaporator 92', 94. The multiple compressor comprises four hermetic scroll type units with a total nominal cooling capacity of 150 kW. In the program this component is described by means of a subroutine that represents the operating curves of the compressor. There are two subroutines that simulate the evaporators: one represents the water-to-refrigerant heat exchanger, while the other represents the air-to-refrigerant heat exchanger. The former is a brazed stainless steel plate type and is portrayed by its performance curves. The latter simulates a finned coil in which the two fluids are assumed to be in perfect counter-flow. The simulation model is analytic and divides the heat exchanger into discreet elements, inside which the properties of the fluids and the heat transfer coefficients are uniform. Depending on the average external surface temperature, an element may be considered dry (subject only to sensible heat transfer, if the dewpoint temperature exceeds that of the surface), or wet (subject to a combination of heat transfer and phase change, if the dewpoint temperature is below that of the surface). In the latter case the heat transfer potentials are the enthalpy of the humid air between air and metal and the temperature difference between the metal and the internal fluid. The variation in the efficiency of the fins, due to the different heat transfer regimes between dry fin and humid fin, must also be taken into account. Just as for the evaporators, two different condensers have been used: one for the water (plate type) and the other (finned coil) for the air. The former uses the performance curves provided by the manufacturer, while the second uses an analytical simulation model of a finned coil which is assumed to be counter-flow. The expansion valve is simply represented by an isenthalpic expansion between the condenser outlet and the evaporator inlet.

Simulation Tests

Figure 7:
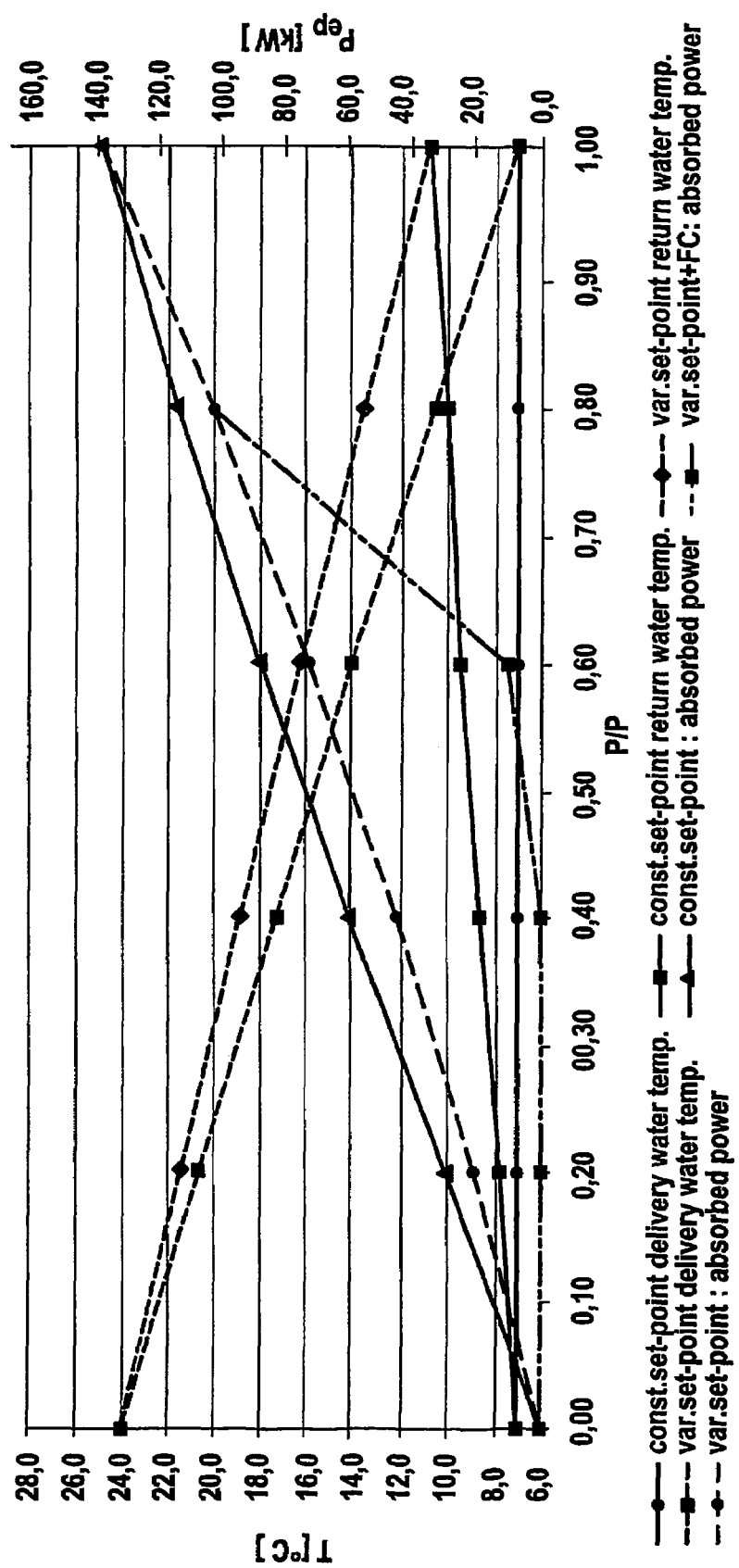
FIG. 7: is a diagram showing cold water temperature and primary energy consumption trends depending on thermal loads, in different system operating modes.

FIG. 7 illustrates the air-conditioning system behaviour in a complete series of tests with an external temperature of 10° C. Such a hypothesis is not mandatory but was chosen to illustrate the potential of the system. The graph shows in abscissa the ratio between the cooling requirement and the capacity, in order to observe the variation in different parameters as the cooling load varies from the maximum value to the minimum. The ordinates scale on one side shows the values of the supply and return water temperatures from the zones and on the other shows the value of the power required by the compressor. This power is evaluated in terms of primary energy, with the aim of allowing a straightforward comparison between a conventional system and one that uses partial or total condenser heat recovery for winter season heating. The primary power ("Pep" in the figures) was calculated with reference to a conventional thermoelectric system with a global thermal efficiency, including distribution loss, equal to 0,33. When the system functions in the winter season, it is possible that, to satisfy the thermal load, a top-up boiler may be used. In this case the consumption of the boiler should be taken into account in computing the primary energy, assuming the boiler efficiency equal to 0.9.

The internal design air temperature is 24° C. The water temperature was calculated according to two different control hypotheses. In the first hypothesis the system is step controlled and supplies cold water to the cold loop at a temperature of 7° C. less the control differential. At part loads, the cooling capacity control in the zones is achieved by means of a cold fluid by-pass of the terminal heat exchangers. This type of control will be hereinafter referred to as constant set-point. The second working hypothesis allows the supply temperature to the zones to be increased compared to the traditional value of 7° C., whenever the cooling load is less than the nominal. The control strategy anticipates that such an increase is pushed up to the maximum value at which the cooling load will still be met consistent with the efficient operation of the heat exchangers. This results in an increase in COP during part load operation since the evaporating pressure rises following the increase in the temperature of the cold water. This type of control will be hereinafter referred to as variable set-point.

The diagram clearly illustrates the advantage of the variable set-point regime when the system works at a part load. As the cooling requirement decreases, the temperature of the water supply to the zones increases, and with it the evaporating temperature until, at zero load, it is equal to the air temperature. This does not occur of course in the constant set-point regime in which the supply temperature remains at 7° C. regardless of any fall in load.

The increase in COP linked to the increase in the evaporating temperature causes a consequent reduction in the primary energy consumed over the day. This can be seen in FIG. 7 where, in the case of the constant set-point, it varies linearly with the cooling capacity, while it reduces in the variable set-point hypothesis. The maximum energy saving is at roughly 50% of the thermal load, as, obviously, the amount of energy consumed is the same with 100% load and a 0% load.

In FIG. 7 a curve of the primary energy consumption is represented that takes into account the possibility of free-cooling operation. This can occur when the temperature of the outside air is sufficiently low to be used as a cold source to substitute the mechanical cooling process. It is evident how much more readily free-cooling can be achieved using variable set-point control, because a significant increase in the temperature of the return water from the cold loop at part loads means much greater heat transfer in the free-cooling coil.

Activation of the free-cooling process is visible on the diagram in correspondence with the rapid fall in primary energy consumption which falls to zero for part loads less than 40%. It should be noted that the lines on the diagram in FIG. 7 are continuous, even though the cooling system operates in steps, since they are based on the average values when the system is cycling. Furthermore it is important to observe that the system can operate, as well as according to the control logic of constant or variable set-point in conjunction with free-cooling where possible, by taking advantage of the condenser heat whenever heating and cooling requirements are contemporaneous. This may be the case in the winter and mid-seasons. To consider the effect of this, two further operating modes were conceived. Both of which combine condenser heat recovery with the possibility of varying supply water temperature. The first control strategy supposes that a system module works with two condensers 92, 92' in parallel. In the plate condenser 92' the necessary heat is recuperated to satisfy the thermal load using a hot water supply temperature of 45° C. to the zone terminals while in the finned coil condenser 92" the excess condenser heat is dissipated. In the event that the module is not sufficient to satisfy the heating demand, it will use the plate condenser 92', with total recovery, and a further module will start to operate with partial recovery. In the load profiles adopted in the examples which follow this eventuality does not arise. This method is hereinafter referred to as "continuous recovery".

In the second method of heat recovery, the module or modules in operating in recovery mode always work at full capacity, ie: taking full advantage of the condenser heat in the plate heat exchanger 92', even when the heat recuperated is less than that of condensation. This recovery method therefore requires the module to operate intermittently. In the simulation this is assimilated with the conditions of stable operation, because the system thermal inertia is assumed to be sufficiently high as to render negligible the temperature variations due to cycling. When the module is not required to supply heat, it works normally with the air cooled condenser. This method is hereinafter referred to as "intermittent recovery". It is evident that this method entails an energy saving compared to continuous recovery, in that it avoids energy wastage due to the increase in condensing temperature in the air cooled condenser to equal that in the water cooled condenser.

The behaviour of the air-conditioning system will now be studied in the operating modes described above, with reference to a load profile typical of technological buildings.

To carry out a complete analysis it was necessary to study the system behaviour in the various seasons. The characteristic load profiles chosen are shown in table 1.

TABLE 1

Load Profiles

| | January | | March | | July | |
|---|---|---|---|---|---|---|
| Time | $P_f$ [kW] | $P_t$ [kW] | $P_f$ [kW] | $P_t$ [kW] | $P_f$ [kW] | $P_t$ [kW] |
| 1.00–2.00 | 375.0 | 0.0 | 375.0 | 0.0 | 375.0 | 0.0 |
| 3.00–4.00 | 487.5 | 0.0 | 487.5 | 0.0 | 487.5 | 0.0 |
| 5.00–6.00 | 562.5 | 0.0 | 562.5 | 0.0 | 562.5 | 0.0 |
| 7.00–8.00 | 637.5 | 0.0 | 637.5 | 0.0 | 637.5 | 0.0 |
| 9.00–16.00 | 675.0 | 75.0 | 712.5 | 37.5 | 750.0 | 0.0 |
| 17.00–18.00 | 637.5 | 0.0 | 637.5 | 0.0 | 637.5 | 0.0 |
| 19.00–20.00 | 562.5 | 0.0 | 562.5 | 0.0 | 562.5 | 0.0 |
| 21.00–22.00 | 487.5 | 0.0 | 487.5 | 0.0 | 487.5 | 0.0 |
| 23.00–24.00 | 375.0 | 0.0 | 375.0 | 0.0 | 375.0 | 0.0 |

These differ only in the thermal loads of the offices, assumed to be constant values throughout the normal working day and absent during the remainder of the day. The load may be a cooling or heating one depending on the season. In July only cooling is required, both for the technological area and for the offices. January and March on the other hand show a reduction in cooling in that the offices then require heating. For an analysis of the operating regime in the various months the temperature and humidity profiles were considered for the region of Padua in a typical day [x].

Simulation Results

January

Figure 8:
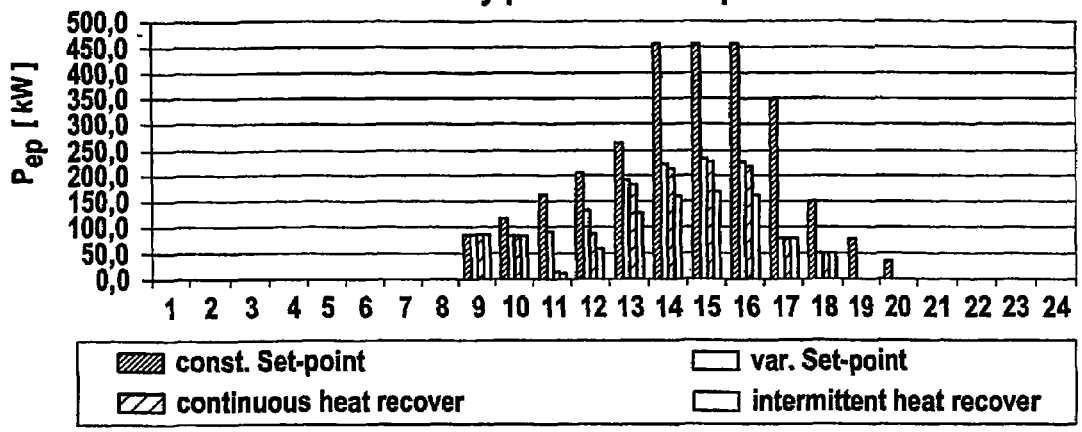
FIG. 8: is a diagram showing hourly progression of primary energy consumption in January.

In FIG. 8 the hourly trend of the primary energy consumption is shown for the four working methods of operation described above. Passing from constant to variable set-point operation, there is an energy saving of 50%. As previously demonstrated, this is due to the fact that it is possible to use an increased supply water temperature to the zones which significantly increases the difference between it and the external air temperature and hence the amount of heat that can be exchanged by the free cooling coil. Operation with heat recovery further improves the energy efficiency. In particular it can be noted that, with variable set-point, continuous recovery only slightly increases the performance. This is explained by the low heating compared to cooling requirements because the energy gain in heat recovery is partly offset by the loss in efficiency caused by the higher condensing pressure with which the unit is forced to operate to produce hot water at 45° C. This energy penalty is reduced to a minimum in the case of intermittent recovery because the system uses the condenser heat more efficiently and consequently the system efficiency is noticeably greater. For an immediate comparison between the energy performances of the different control methods, the daily energy consumption for each for the three months examined are shown in Table 2 hereinafter. It can be observed that, by not recovering condenser heat, the saving of 50.7% in primary power absorbed in variable set-point operation is a saving purely in electrical energy and can therefore be translated into an economic saving of the same percentage. In the heat recovery operating modes however, the primary energy saving relates to different types of energy (electricity and thermal energy) which, although comparable through the concept of primary energy, cannot be unambiguously translated into economic savings because they will depend upon the different tariffs in force.

March

Figure 9:
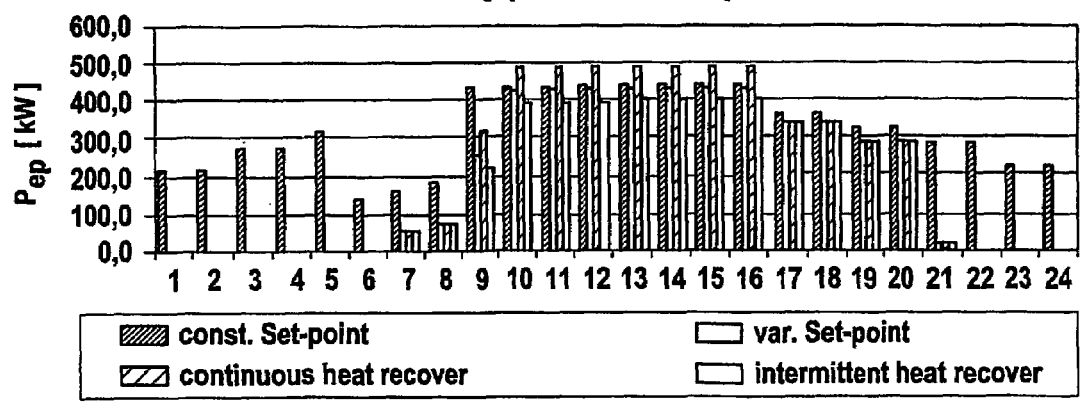
FIG. 9: is a diagram showing hourly progression of primary energy consumption in March.

Just as for the month of January, FIG. 9 shows the hourly trend of the primary energy consumption for the four working methods of operation described above. In this case one can see that the saving obtainable by passing from constant set-point to variable set-point operation is less than in the previous case, as the possibility to use free cooling is reduced due to an increase in the outside temperature. As regards heat recovery operation, it is evident that continuous recovery reduces the performance in a few hours of the day, compared to the other operating modes. In this case in fact the heating requirements are lower than in the winter months so the benefit of heat recovery does not compensate for the efficiency penalty for the unit due to the increase in the condensing pressure. In intermittent recovery operation this penalty does not occur because, as explained above, the condenser heat is used with the maximum efficiency July From the analysis of the hourly trends in the primary energy consumption in the constant set-point and variable set-point operating modes it is apparent that the energy saving increases the further the conditions move away from those of maximum load which apply during the middle hours of the day, i.e.: the greater the part load operation, the greater the saving.

Figure 10:
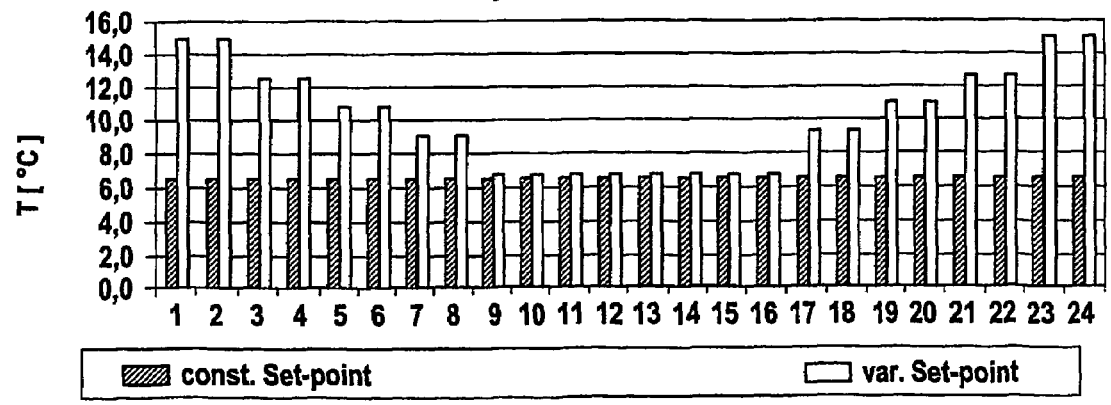
FIG. 10: is a diagram showing hourly trends of supply water temperature.

This is explained by the supply water temperature profiles in the two operating modes, shown in FIG. 10, where, in the variable set-point control method, the rise in water temperature as the load decreases is evident. Finally, Table 2 shows the daily primary energy consumption. The percentage energy saving is not particularly high because during the hours at maximum load the behaviour of the system is the same for both control regimes. The absolute value of the saving is worthy of attention however.

TABLE 2

Daily energy consumption in different seasons [kWh/day]

|  | Absorbed power [kWh/day] | Difference compared to constant set-point mode [kWh/day] | Percentage difference [%] |
| --- | --- | --- | --- |
| January | | | |
| Constant Set-point | 2792 | | |
| Variable Set-point | 1378 | −1414 | −50.7 |
| Variable set-point and continuous recovery | 1220 | −1572 | −56.3 |
| Variable set-point and intermittent recovery | 964 | −1828 | −65.5 |
| March | | | |
| Constant set-point | 7623 | | |
| Variable set-point | 4628 | −2996 | −39.3 |
| Variable set-point and continuous recovery | 5118 | −2505 | −32.9 |
| Variable set-point and intermittent recovery | 4364 | −3260 | −42.8 |

TABLE 2-continued

Daily energy consumption in different seasons [kWh/day]

|  | Absorbed power [kWh/day] | Difference compared to constant set-point mode [kWh/day] | Percentage difference [%] |
| --- | --- | --- | --- |
| July | | | |
| Constant set-point | 10660 | | |
| Variable set-point | 10136 | −524 | −4.9 |

It will be noted that in the months of January and March, the outside air temperature permits use of the free-cooling function for a few hours of the day depending on the control strategy.

The invention claimed is:

1. An air-conditioning system for a building comprising:
   a hot water distribution circuit;
   a cold water distribution circuit;
   a plurality of terminal air conditioning units, wherein each of said units comprises a fan for blowing air in a space of said building, and at least one of a heating coil connected to said hot water distribution circuit and a cooling coil connected to said cold water distribution circuit;
   at least one ambient temperature control system for controlling heating power of said heating coils and cooling power of said cooling coils; and
   a calorific energy management system including an energy provider with a heat pump cycle configured to transfer calorific energy from said cold water distribution system to said hot water distribution system.

2. The air-conditioning system as claimed in claim 1, wherein said energy provider with a heat pump cycle is further configured to transfer calorific energy:
   a) from said cold water distribution system to atmosphere; and
   b) from the atmosphere to said hot water distribution system;
   wherein said calorific energy management system is configured to manage said calorific energy transfers to optimize energy consumption.

3. The air-conditioning system as claimed in claim 2, wherein the optimizing energy consumption includes a minimization of global primary energy consumption or a minimization of global energy costs of said air-conditioning system.

4. The air-conditioning system as claimed in claim 1, wherein said calorific energy management system further includes:
   an air/water heat exchanger configured to transfer calorific energy from said cold water distribution system to atmosphere.

5. The air-conditioning system as claimed in claim 1, further comprising:
   a heat generator configured to produce calorific energy and to transfer the calorific energy to said hot water distribution system.

6. The air-conditioning system as claimed in claim 1, further comprising:
   a cooling energy buffer tank, wherein said calorific energy management system is configured to remove calorific energy from said cooling energy buffer tank to load the cooling energy buffer tank and to transfer calorific energy from said cold water distribution system to said cooling energy buffer tank.

7. The air-conditioning system as claimed in claim 1, further comprising:
a heating energy buffer tank, wherein said calorific energy management system is configured to supply calorific energy to said heating energy buffer tank to load the heating energy buffer tank and to transfer calorific energy from said heating energy buffer tank to said hot water distribution system.

8. The air-conditioning system as claimed claims 1, wherein said calorific energy management system is further configured to:
monitor cooling/heating energy requirements of each of said terminal air conditioning units; and
set-point variation of said cold and hot water circuit temperatures in function of said cooling/heating energy requirements of said terminal air conditioning units.

9. The air-conditioning system as claimed in claim 1, wherein said calorific energy management system is further configured to manage said calorific energy transfers taking into account global building heating/cooling requirements, outside climatic parameters, and primary energy costs.

10. The air conditioning system as claimed in claim 1, wherein:
said hot water distribution circuit and said cold water distribution circuit include quick-fitting connections at regular intervals for connecting thereto a heating coil and a cooling coil, respectively, by flexible tubes.

11. The air-conditioning system as claimed in claim 1, wherein:
said terminal air conditioning units are installed in a plenum space either under a raised floor or above a suspended ceiling, wherein fans of said terminal air conditioning units take in air from said plenum space.

12. The air-conditioning system as claimed in claim 11, wherein said at least one of the terminal air conditioning units further comprises:
a filter mounted in said modular casing, wherein said filter is replaceable by an inspection slot in said floor panel.

13. The air-conditioning system as claimed in claim 11, wherein at least one of the terminal air conditioning units includes:
a modular casing mounted under a floor panel of a raised floor, said modular casing including a supply air outlet, connected to an air inlet grid in said floor panel, and a mixing chamber with a return air port and a fresh air port;
a fan mounted in said modular casing to take in air from said mixing chamber and blow the air through said air inlet grid in said floor panel into a building zone located above said raised floor plenum;
a direct-expansion cooling unit for cooling and dehumidification of the air, said direct-expansion cooling unit being mounted in said modular casing and comprising a water-cooled condenser connected to said cold water circuit; and
a post-heating coil mounted in said modular casing and connected to said hot water circuit for reheating the air after its dehumidification.

14. The air-conditioning system as claimed in claim 11, further comprising:
a fresh air conditioning unit configured to pre-condition fresh air and to supply the fresh air into said plenum space.

15. The air-conditioning system as claimed in claim 1, wherein at least one of the terminal air conditioning units comprises:
a modular casing mounted under a floor panel of a raised floor, said modular casing including a supply air outlet connected to an air inlet grid in said floor panel and an air inlet opening in said plenum space;
a fan mounted in said modular casing to take in air from said plenum space through said air inlet and blow the air through said air inlet grid in said floor panel into a building zone located above said raised floor plenum; and
at least one of a heating coil connected to at least one said hot water distribution system and a cooling coil connected to said cold water distribution system, said heating coil and cooling coil being mounted in said modular casing in-between said fan and said supply air outlet.

16. The air-conditioning system as claimed in claim 1, wherein said energy provider includes:
at least one compressor for a refrigerant;
a water cooled condenser for said refrigerant, said water cooled condenser being connected to said hot water distribution circuit for transferring condensation energy to said hot water circuit;
an evaporator for said refrigerant, said evaporator being connected to said cold water distribution circuit for taking evaporation energy from said cold water circuit;
an air cooled condenser for said refrigerant that is connected in parallel with said water cooled condenser, said air cooled condenser configured to transfer a surplus of condensation energy to atmosphere; and
a free cooling coil connected in said cold water distribution circuit in series with said water cooled evaporator.

17. The air-conditioning system as claimed in claim 16, wherein said air cooled condenser is an air/refrigerant heat exchanger configured to work as an evaporator for said refrigerant taking evaporation energy from the atmosphere.

18. An air-conditioning system for a building comprising:
a hot water distribution circuit:
a cold water distribution circuit:
a plurality of terminal air conditioning units, wherein each of said units comprises a fan for blowing air in a space of said building, and at least one of a heating coil connected to said hot water distribution circuit and a cooling coil connected to said cold water distribution circuit:
at least one ambient temperature control system for controlling heating power of said heating coils and cooling power of said cooling coils; and
a calorific energy management system including an energy provider with a heat pump cycle configured to:
a) transfer calorific energy from said cold water distribution system to said hot water distribution system;
b) from said cold water distribution system to atmosphere; and
c) from the atmosphere to said hot water distribution system:
wherein said calorific energy management system is configured to manage said calorific energy transfers to minimize global primary energy consumption or global energy costs of said air-conditioning system.

19. The air-conditioning system as claimed in claim 18, wherein said calorific energy management system is further configured to manage said calorific energy transfers taking into account global building heating/cooling requirements, outside climatic parameters, and primary energy costs.

20. The air-conditioning system as claimed in claim 19, wherein said calorific energy management system is further configured to:
- monitor cooling/heating energy requirements of each of said terminal air conditioning units; and
- set-point variation of said cold and hot water circuit temperatures in function of said cooling/heating energy requirements of said terminal air conditioning units.

21. The air-conditioning system as claimed in claim 18, wherein said calorific energy management system further includes:
- an air/water heat exchanger configured to transfer calorific energy from said cold water distribution system to atmosphere.

22. The air-conditioning system as claimed in claim 18, further comprising:
- a cooling energy buffer tank, wherein said calorific energy management system is configured to remove calorific energy from said cooling energy buffer tank to the cooling energy buffer tank and to load the transfer calorific energy from said cold water distribution system to said cooling energy buffer tank.

23. The air-conditioning system as claimed in claim 18, further comprising:
- a heating energy buffer tank, wherein said calorific energy management system is configured to supply calorific energy to said heating energy buffer tank to load the heating energy buffer tank and to transfer calorific energy from said heating energy buffer tank to said hot water distribution system.

24. An air-conditioning system for a building comprising:
- a hot water distribution circuit and a parallel cold water distribution circuit, each of said systems including quick-fitting connections at regular intervals;
- a plurality of terminal air conditioning units, wherein each of said units comprises a fan for blowing air in a space of said building, and at least one of a heating coil connected to said hot water distribution circuit and a cooling coil connected to said cold water distribution circuit, said at least one of the heating coil and cooling coil being connected by flexible tubes to said quick-fitting connections of said hot water distribution circuit and said cold water distribution circuit respectively;
- at least one ambient temperature control system for controlling heating power of said heating coils and cooling power of said cooling coils; and
- a calorific energy management system including a energy provider with a heat pump cycle configured to transfer calorific energy from said cold water distribution system to said hot water distribution system.

25. The air-conditioning system as claimed in claim 24, wherein:
- said terminal air conditioning units are installed in a plenum space either under a raised floor or above a suspended ceiling, wherein said fans of said terminal air conditioning units take in air from said plenum space.

26. The air-conditioning system as claimed in claim 24, further comprising:
- a fresh air conditioning unit configured to pre-condition fresh air and to supply the fresh air into said plenum space.

27. The air-conditioning system as claimed in claim 26, wherein at least one of the terminal air conditioning units comprises:
- a modular casing mounted under a floor panel of a raised floor, said modular casing including a supply air outlet connected to an air inlet grid in said floor panel and an air inlet opening in said plenum space;
- a fan mounted in said modular casing to take in air from said plenum space through said air inlet and blow the air through said air inlet grid in said floor panel into a building zone located above said raised floor plenum; and
- at least one of a heating coil connected to said hot water distribution system and a cooling coil connected to said cold water distribution system, said heating coil and cooling coil being mounted in said modular casing in-between said fan and said supply air outlet.

28. The air-conditioning system as claimed in claim 27, wherein said terminal air conditioning unit further comprises:
- a filter element in said modular casing, wherein said filter is replaceable by an inspection slot in said floor panel.

29. The air-conditioning system as claimed in claim 26, wherein at least one of the terminal air conditioning units comprises:
- a modular casing mounted under a floor panel of a raised floor, said modular casing including a supply air outlet, which is connected to an air inlet grid in said floor panel, and a mixing chamber with a return air port and a fresh air port;
- a fan mounted in said modular casing to take in air from said mixing chamber and blow the air through said air inlet grid in said floor panel into a building zone located above said raised floor plenum;
- a direct-expansion cooling unit for cooling and dehumidification of the supply air, said direct-expansion cooling unit being mounted in said modular casing and comprising a water-cooled condenser connected to said cold water circuit; and
- a post-heating coil mounted in said modular casing and connected to said hot water circuit for reheating the air after its dehumidification.

* * * * *